United States Patent [19]

Weimer

[11] 3,873,851

[45] Mar. 25, 1975

[54] CHARGE TRANSFER DECODERS

[75] Inventor: Paul Kessler Weimer, Princeton, N.J.

[73] Assignee: RCA Corporation, New York, N.Y.

[22] Filed: Aug. 31, 1973

[21] Appl. No.: 393,625

[30] Foreign Application Priority Data

Sept. 25, 1972 United Kingdom.............. 44292/72

[52] U.S. Cl............. 307/221 C, 307/243, 307/251, 307/304

[51] Int. Cl....................... G11c 19/00, H03k 19/08

[58] Field of Search............ 307/221 R, 221 C, 251, 307/304, 242, 243; 340/166 R

[56] References Cited

UNITED STATES PATENTS

| | | | |
|---|---|---|---|
| 3,614,327 | 10/1971 | Low | 307/243 |
| 3,643,106 | 2/1972 | Berwin et al. | 307/221 C |
| 3,763,480 | 10/1973 | Weimer | 307/221 C |
| 3,764,824 | 10/1973 | Sangster | 307/221 C |

OTHER PUBLICATIONS

Special Report (RCA) by Kovac et al. (reprinted from Electronics (Feb. 28, 1972) pages (6).

*Primary Examiner*—Stanley D. Miller, Jr.
*Attorney, Agent, or Firm*—H. Christoffersen; H. I. Schanzer

[57] ABSTRACT

Charge transfer decoder circuits for coupling, one at a time, a plurality of signal input points to a single output terminal. Signals, applied in parallel to the input points, are propagated, in an ordered sequence, from the input points to the output terminal along selectively enabled transfer paths, where each path includes the same number of charge transfer devices.

13 Claims, 3 Drawing Figures

PATENTED MAR 25 1975 3,873,851

SHEET 3 OF 3

CHARGE TRANSFER DECODERS

This invention is directed to charge transfer decoders.

In many systems, signals are produced concurrently at a plurality of terminals. For example, an image sensor matrix array may include elements arranged in rows and columns. Each time a row is read out, the information associated with each element of that row is transferred to a different one of the column conductors. The signals applied, in prallel, to the column conductors must then be sequentially transferred parallel, a single output terminal.

known, conventional, decoding schemes for performing this function require many components and/or attenuate the signal and introduce noise spikes into the signal. The advent of charge transfer circuits of the bucket brigade and charge coupled type which provide extremely efficient transfer to charge signals suggests they be used instead of conventional circuits.

A known charge transfer circuit for sequentially transferring the signals from the columns to a single output terminal includes an output register having a number of stages equal to the number of columns. Each stage of the output register is connected to a different column. The signals from the row being read out are transferred in parallel to the column conductors and from the column conductors to the output register. The signals in the output register are then propagated from stage-to-stage through the output register and are sequentially produced at the output terminal. A problem arising in this type of system is that the information from the columns most distant from the output terminal must pass through many stages before reaching the output terminal. In addition, the signals in the different columns are attenuated different amounts due to the different numbers of register stages through which they pass. Also, the output register must be operated at relatively high frequency in order to be cleared and ready to be reloaded with signals from another row. High frequency operation causes further attenuation of the transferred signals.

Another approach for reading out arrays includes the connection of each column conductor through a switch to an output terminal. But, coupling many switches to one output terminal increases the capacitance at the output terminal, causing the signals coupled thereto to be significantly attenuated. For example, an array having 500 columns, each connected through a switch to one output terminal would require 500 switches. Such a large number of switches would substantially increase the capacitance of the output load, thereby increasing the spurous switching transients contained in the output signal and reducing output signal-to-noise ratio. Furthermore, a single digital shift register is required, having as many stages in sequence as there are columns to control the column switches.

Circuits embodying the invention include a plurality of input terminals adapted to receive signals in parallel. A plurality of charge transfer paths, each path including the same number of charge transfer devices, connects each input point to a single output terminal. These paths are selectively enabled for sequentially transferring charge signals from said input terminals to said output terminal.

In the drawings appended hereto, like characters denote like components; and

The transistors used to illustrate the invention are assumed to be insulated-gate field-effect transistors (IGFETS) of P conductivity type. This is by way of example only and, other suitable types of devices (e.g., charge coupled devices — CCD) or transistors having a control electrode and a conduction path could be used, instead of or in combination with the transistors shown, to practice the invention. In the description to follow each transistor is denoted by a capital letter (S, I, Q) followed by two numerals, $(i, j)$. The first numeral (i) defines the order of the row or stage and the second numeral $(j)$ defines the line or column.

Some of the transistors (i.e., transistors T2$j$, T3$j$, Q2$j$ and Q3$j$) have a capacitor connected between their gate and drain electrodes. So connected, these transistors, when enabled, transfer a signal in the form of charge from their source electrode to their drain electrode. These transistors are referred to, generically, as charge transfer devices.

Figure 1:
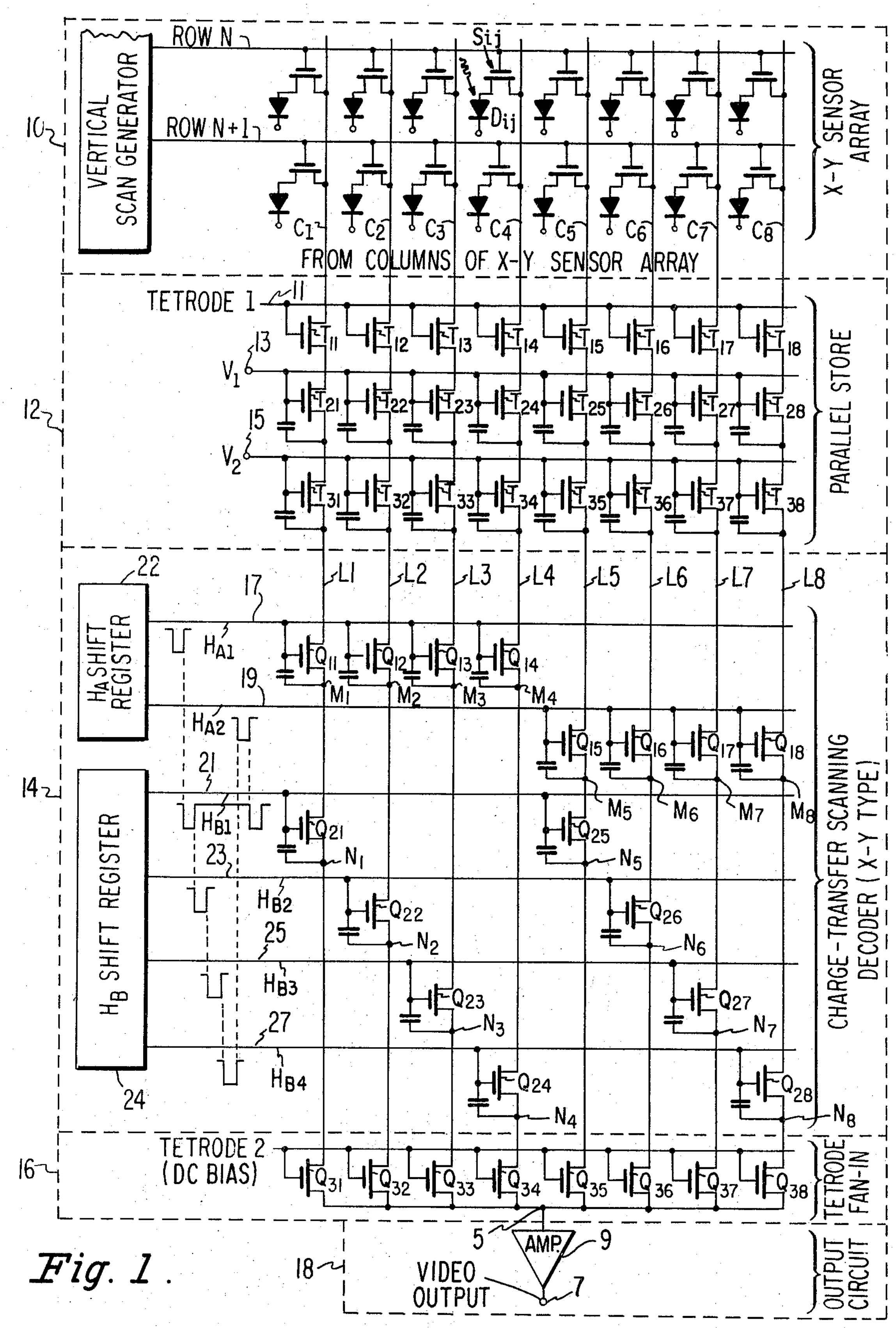
FIG. 1 is a schematic diagram of a sensor and decoder arrangement embodying the invention.

The circuit of FIG. 1 includes an X-Y image sensor array 10, two rows and eight columns of which are shown. Each element of the array includes a photodiode D$ij$, and a transistor S$ij$, where the subscript $i$ denotes the row and the subscript $j$ denotes the column. Each transistor ($S_{ij}$) of the array has its gate electrode connected to a row (X) conductor, one end of its conduction path connected to a column (Y) conductor and the other end of its conduction path connected to the anode of a photodiode. A potential is applied to the cathodes of the photodiodes to maintain them reverse biased. An enabling pulse applied to a row conductor turns on all the transistors in that row. The transistors of the row then couple the signals produced at their corresponding photodiodes to the columns of the array. Thus, each time a row is enabled the signals generated by the photodiodes of that row are coupled to the columns and charge (or discharge) the column capacitances. It is these charge signals which, eventually, are sequentially produced at output terminal 5.

A parallel store 12 serves to transfer, in parallel, the signals from the column conductors of the sensor to the input lines (L1 through L8) of the decoder 14. The parallel store also enables the decoder 14 to be isolated from the sensor 10. The parallel store, 12, includes three rows of transistors. The first row of transistors (T1$j$), is optional. The transistors (T1$j$) in the first row are connected at their gates to conductor 11 to which is applied a fixed bias voltage (−V volts). Transistors T1$j$ being biased "on" operate as grounded gate amplifiers. The use of grounded gate amplifiers enhances the transfer of charge signals from the column conductors which have relatively high capacitance, to the second row of the parallel store. The transistors (T2$j$) in the second row (which in effect is the first stage of the parallel store) have their gate electrodes connected in common to conductor 13 to which is applied a pulse $V_1$. The gate electrodes of the transistors (T3$j$) of the third row (the second stage of the parallel store) are connected in common to conductor 15 to which is applied a pulse $V_2$. Information taken from the sensor is stored in the second row while the information in the third row, controlled by the pulse $V_2$, is being transferred by the decoder to the output terminal 5.

Decoder 14 transfers in a predetermined sequence, the signals present at its input lines (L1 through L8) to output terminal 5. Between each input line and the output terminal 5 there are two decoding transistors (Q1*j*, Q2*j*) having their conduction paths connected in series with the conduction path of a transistor (Q3*j*). Enabling the two decoding transistors of a line causes the transfer of signal from that line to the output. Each transistor Q3*j* is biased "on," having −V volts applied to its gate, and couples a decoded output to output terminal 5 while isolating the decoder from the output terminal. Each transistor Q3*j* is connected as a triode. But the combination of transistors Q2*j* and Q3*j* functions like a tetrode.

Shift register 22 produces sequential outputs $H_{A1}$ and $H_{A2}$ on conductors 17 and 19, respectively. The gate electrodes of transistors Q11 through Q14 are connected to conductor 17 and the gate electrodes of transistors Q15 through Q18 are connected to conductor 19. Shift register 24 produces sequential outputs $H_{B1}$, $H_{B2}$, $H_{B3}$ and $H_{B4}$ on conductors 21, 23, 25 and 27, respectively. The gate electrodes of transistors Q21 and Q25 are connected to conductor 21, the gate electrodes or transistors Q22 and Q26 are connected to conductor 23, the gate electrodes of transistors Q23 and Q27 are connected to conductor 25 and the gate electrodes of transistors Q24 and Q28 are connected to conductor 27. Thus, the eight inputs (L1 through L8) to decoder 14 are subdivided into two groups of four each. One group (L1 through L4) is controlled by the $H_{A1}$ clock signals and the other group (L5 through L8) is controlled by the $H_{A2}$ clock signals. Each group is then subdivided into four subgroups, each subgroup being controlled by a different one of the $H_{B1}$, $H_{B2}$, $H_{B3}$ and $H_{B4}$ clock signals. $H_A$ shift register 22 and $H_B$ shift register 24 may be any one of a number of known shift registers.

Terminal 5 is connected to the input of amplifier stage 9, which may be any one of a number of known amplifiers. The output of amplifier 9 is connected to terminal 7 denoted the "video output."

To best understand the discussion of the operation of the decoder, which follows, the conditions for charge transfer from one device to a succeeding device along a path are detailed below.

For P type devices, the gate potential of the charge transfer devices ($T_{2j}$, $T_{3j}$, $Q_{1j}$, $Q_{2j}$) is driven between +V volts (typically +3 volts) and −V volts (typically −3 volts). When +V volts is applied to the gate of a device it is turned off and cannot transfer charge. When the potential applied to the gate of a charge transfer device goes from +V volts to −V volts, the device is enabled and charge transfer from the source to the drain can occur. The gate is at −V volts and the drain goes to −3V volts due to the coupling of the negative 2V volts step through the gate-to-drain capacitance ($C_{DG}$). Charge transfer occurs if the potential at the source electrode of the device is more positive than its gate potential.

For example, assume that charge is to be transferred from the drain (mode L1) of transistor T31 (a "donor") to the drain (node M1) of transistor Q11 (a "receiver"). Assume also that the potential ($V_{L1}$) at the drain (L1) of transistor T31 is equal to $(-3V + e_{s1})$ volts when the pulse $V_2$ is at −V volts and that $V_{L1}$ is $(-V + e_{s1})$ volts when the pulse $V_2$ goes to +V volts. $V_{L1}$ is identically the potential at the source electrode of transistor Q11. When the potential ($H_{A1}$) applied to the gate of Q11 is +V volts, transistor Q11 is disabled and no charge transfer can occur since the gate potential is more positive than either the source or the drain voltage. When $H_{A1}$ goes to −V volts, transistor Q11 is enabled and can conduct depending on the potential at its source electrode. If the potential at L1, the source of Q11 is −V volts or less, Q11 though enabled will not conduct. If the potential at L1 is more positive than −V volts the charge corresponding to that potential is transferred to node M1. Thus, two conditions have to be met for the transfer of charge signals from a "donor" device to a "receiver" device: (1) −V volts must be applied to the gate of the receiver device, i.e., the transistor must be enabled; and (2) the source potential of the receiver must be more positive than −V volts. For this to occur, the gate of the donor transistor must be driven to +V volts.

In the operation of the circuit of FIG. 1 assume that the potential of each one of the column conductors C1 through C8 is normally at −V volts. When a row of information is read out the column conductor potential rises to $(-V + e_{sj}$ volts, where $e_{sj}$ is a signal voltage whose amplitude is a function of the charge of the corresponding photodiode transferred to the column conductor. Transistors $T_{1j}$ of parallel store 12 are biased on, having −V volts applied to their gate electrodes. The charge signals present on column conductors C1 through C8 are transferred in parallel to the second row of the parallel store 12 when the signal $v_1$ applied to conductor 13 goes from +V volts to −V volts and enables all the transistor $T_{2j}$ in the second row. This applies a potential of −V volts to the gates and −3V volts (through the gate-to-drain capacitance) to the drains of transistors $T_{2j}$. The charge signals present on the column conductors are transferred to the drains of transistors $T_{2j}$, causing the potential thereat to rise to $(-3V + e_{sj})$ volts; where $e_s$ denotes the signal at the node and the subscript *j* specifies the line or column conductor. When $V_1$ returns to +V volts, transistor $T_{2j}$ are turned off and the potential at their drains due to the $C_{DG}$ is raised to $(-1 + e_{2j})$ volts.

When the $V_2$ pulse goes from +V volts to −V volts all the transistors $T_{3j}$ are enabled. The charge signals are transferred in parallel from the second row of the parallel store 12, to lines L1 through L8, establishing thereat a potential of $(-3V + e_{sj})$ volts. Following the return of the $V_2$ pulse to +V volts, the signals present on lines L1 through L8 are raised to the level of $(-V + e_{sj})$ volts. The signals present on lines L1 through L8 may then be sequentially transferred to terminal 5 by means of decoder 14 and tetrode fan-in circuit 16.

Assume that shift register 22 produces an enabling $H_{A1}$ pulse on conductor 17. For P-type devices the enabling $H_{A1}$ pulse is a negative going pulse of similar amplitude to the $V_1$ pulse but, typically, of shorter duration. The $H_{A1}$ pulse enables transistors Q11 through Q14 and the charge signals present on lines L1 through L4 are transferred to nodes M1 through M4. Following the negative going excursion of the $H_{A1}$ pulse (from +V volts to −V volts) the potential at each one of the nodes M1 through M4 may be expressed as $(-3V + e_{sj})$. When $H_{A1}$ returns from −V volts to +V volts, transistors Q11 through Q14 are cut off and the potential at their drains (nodes M1 through M4) is raised 2V volts and may be expressed as $(-V + e_{sj})$ volts.

Pulses produced by $H_B$ register 24, which are of similar amplitude to the $H_A$ pulses, enable transistors $Q_{2j}$ and cause the signals at nodes $M_j$ to be transferred to the corresponding $N_j$ node. For example, a negative going $H_{B1}$ pulse enables transistor Q21, and the signal at node M1 is transferred to node N1. When $H_{B1}$ again goes positive the signal a node N1 is then directly transferred by means of tetrode transistor Q31 to terminal 5. Transistors $Q_{3j}$, biased "on" by the application of a $-V$ volt potential to their gate electrodes, transfer any signal to terminal 5 at their source above $-V$ volts. Similarly, applying negative going (enabling) pulses $H_{B2}$, $H_{B3}$ and $H_{B4}$, in sequence, on conductors 23, 25 and 27, sequentially enables transistors Q22, Q23 and Q24 for sequentially transferring to terminal 5 the charge signals present at nodes M2, M3 and M4.

The enabling (negative going) $H_B$ pulses also enable transistors Q25, Q26, Q27 and Q28. But, since there are no signals at nodes M5 through M8, transistors Q25 through Q28 remain nonconducting and only the charge signals at nodes M1 through M4 are sequentially produced at terminal 5.

When an enabling $H_{A2}$ pulse is applied to conductor 19 (i.e., $H_{A2}$ goes from $+V$ volts to $-V$ volts), the second group of decoding devices (i.e., transistors Q15 through Q18) are enabled, and the charge signals stored on lines L5 through L8 are transferred in parallel to nodes M5 through M8. When $H_{A2}$ goes positive again, the $H_B$ pulses then sequentially cause the transfer of these signals to terminal 5 in a manner similar to that described above. In charge transfer decoders embodying the invention there is partial decoding of signals (e.g., the signals on L1 through L4 are transferred in parallel to M1 through M4) and signals are decoded by charge transfer from stage-to-stage along selected transfer paths. This is in contrast to conventional decoding schemes where, for transfer to occur, all the switches or devices along a selected conduction path have to be energized to provide a conduction path between an input and output point.

Charge transfer decoders of the type shown in FIG. 1 require only two transfers ($Q_{1j}$, $Q_{2j}$) per column or line. In general, to uniquely decode one of Z input terminals, this type of decoder requires transfer devices arranged into two decoding stages, where each stage includes Z devices. The first decoding stage (transistors $Q_{1j}$) may be subdivided Z. W1 groups, each group having W2 devices, where $W1 \times W2 = A$. Each one of the W1 groups is controlled by a different control signal and requires a control line. The second decoding stage (transistors $Q_{2j}$) includes W2 subgroups, each subgroup including W1 devices. Each one of the W2 subgroups is controlled by a different control signal and requires a control line. The total number of required control lines is thus W1 + W2. In the circuit of FIG. 1 where Z is equal to 8 the first decoding stage is divided into two groups ($W1 = 2$) controlled by two control lines (17, 19) to which two signals ($H_{A1}$, $H_{A2}$) are applied which are derived from shift register 22 having two stages. The second decoding stage is divided into four groups ($W2 = 4$) controlled by four control lines (21, 23, 25, 27) to which are sequentially applied signals $H_{B1}$, $H_{B2}$, $H_{B3}$ and $H_{B4}$ derived from register 24 having four stages.

In a system where the number of input terminals is 512 (e.g., with an XY sensor having 512 elements per row) the decoding could be subdivided into 16 groups (W1) and 32 subgroups (W2) and the total number of control lines would be $(W1 + W2) = 48$.

The number of leads necessary to drive the decoder as well as the number of transfer devices to form the decoder are an important consideration. The two transfer stages between the input and output of the decoder presents a significant advantage. However, the number of lines and shift register stages necessary to drive the decoder may, in some applications, impose limitations on the ability to successfully fabricate the circuit in a minimum size.

Figure 2:
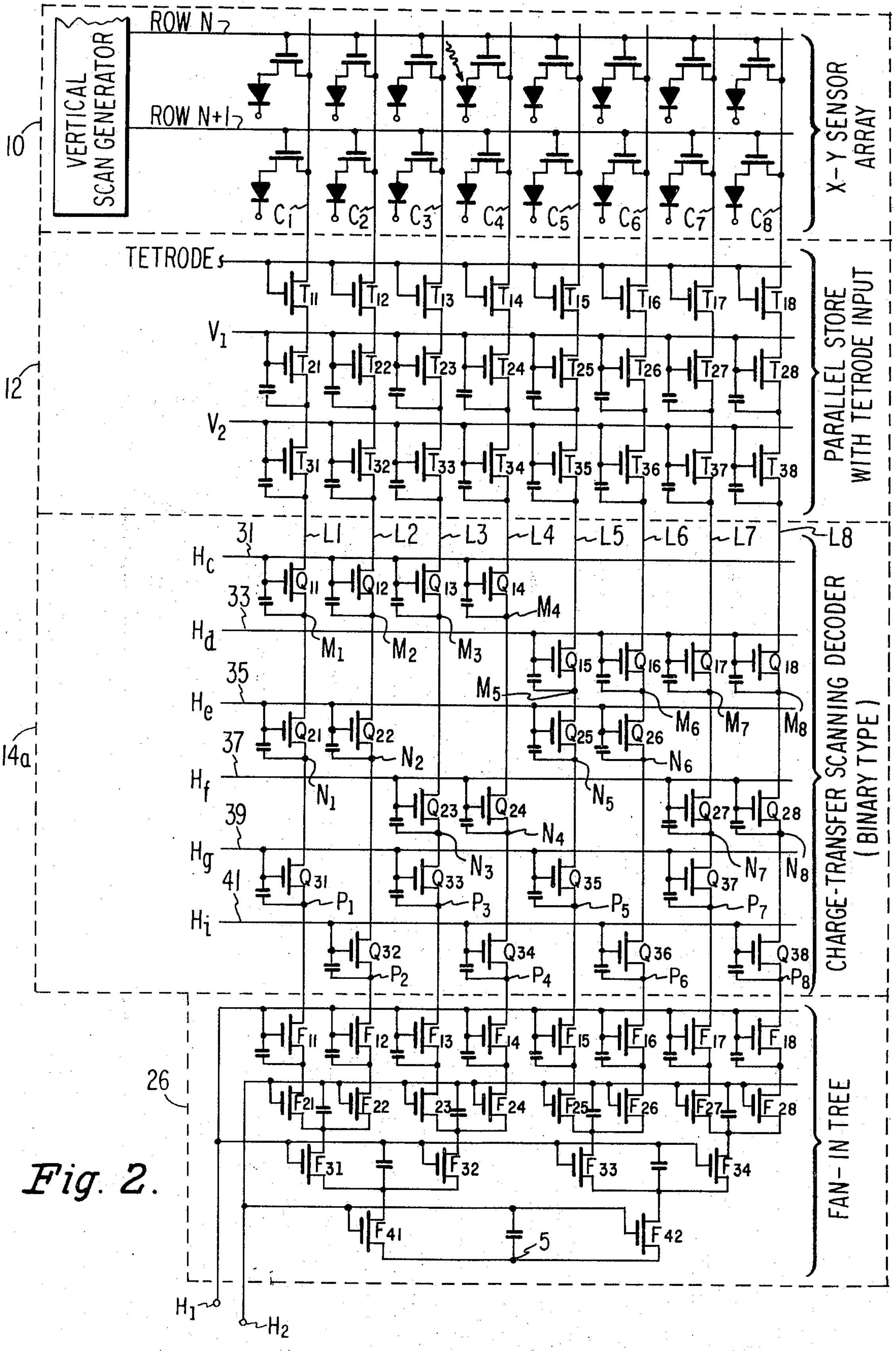
FIG. 2 is a schematic diagram of another arrangement embodying the invention.

FIG. 2 shows another form of charge transfer decoder in which there are more transfer stages per column but in which the number of control lines necessary to drive the decoder is minimized.

As in FIG. 1, the circuit includes a matrix array 10 whose column conductors C1 through C8 are coupled to a parallel store 12, which transfers, in parallel, the signals from the column conductors to the input lines (L1 through L8) of a decoder 14*a*.

In the decoder 14 is illustrated in FIG. 2, each of the eight input lines is uniquely decoded by means of three transfer stages. The first decoding stage includes transistors $Q_{1j}$ which are divided into two groups. The first group of transistors, Q11 through Q14, have their gate electrodes connected to conductor 31 to which is applied the $H_c$ pulse, and the second group of transistors, Q15 through Q18, have their gate electrodes connected to conductor 33 to which is applied to $H_d$ pulse. The second decoding stage includes transistors $Q_{2j}$ divided into two groups. The first group of transistors Q21, Q22, Q25 and Q26 have their gate electrodes connected to conductor 35 to which is applied in $H_e$ pulse, and the second group of transistors Q23, Q24, Q27 and Q28 have their gate electrodes connected to conductor 37 to which is applied the $H_f$ pulse. The third decoding stage includes transistors $Q_{3j}$ also divided into two groups. The first group of transistors Q31, Q33, Q35 and Q37 have their gate electrodes connected to conductor 39 to which is applied the $H_g$ pulse, and the second group of transistors Q32, Q34, Q36 and Q38 have their gate electrodes connected to conductor 41 to which is applied to $H_i$ pulse. Note that each group in a decoding stage includes a different one-half of the transistors from the groups of the preceding decoding stage.

Each stage includes a single transfer device and the three transfer devices decoding one line have their source-drain paths connected in series. For example, line L1 is decoded by means of sequentially enabling transistors Q11, Q21 and Q31. Charge signals are transferred from line L1 to node M1, from node M1 to node N1 and from node N1 to node P1. Nodes P1 through P8 are coupled to output terminal 5 by means of a charge transfer fan-in tree 26. The fan-in tree 26 is used as an alternative to the tetrode fan-in of FIG. 1. The fan-in tree transfers each decoded output along converging transfer paths which maintain the capacitance at each succeeding node approximately equal to that at a preceding node. This enables the transfer of the decoded output without loss of signal level.

Where the number of input terminals to be decoded is N, the number, *n*, of decoding stages (or transistors connected in series) to decode the N input terminals may be obtained from the expression: $2^n = N$. The number of lines necessary to drive this decoder is $2 \times n$. For the $N = 8$ input terminal decoder illustrated in FIG. 2, $n = 3$ decoding stages are needed to uniquely decode each input line. In a system where the number of input terminals N is 512 the number of decoding stages, $n$, would be equal to 9 and the number of control lines needed to drive the decoder stages would be equal to $2 \times n$ or 18.

Figure 3:
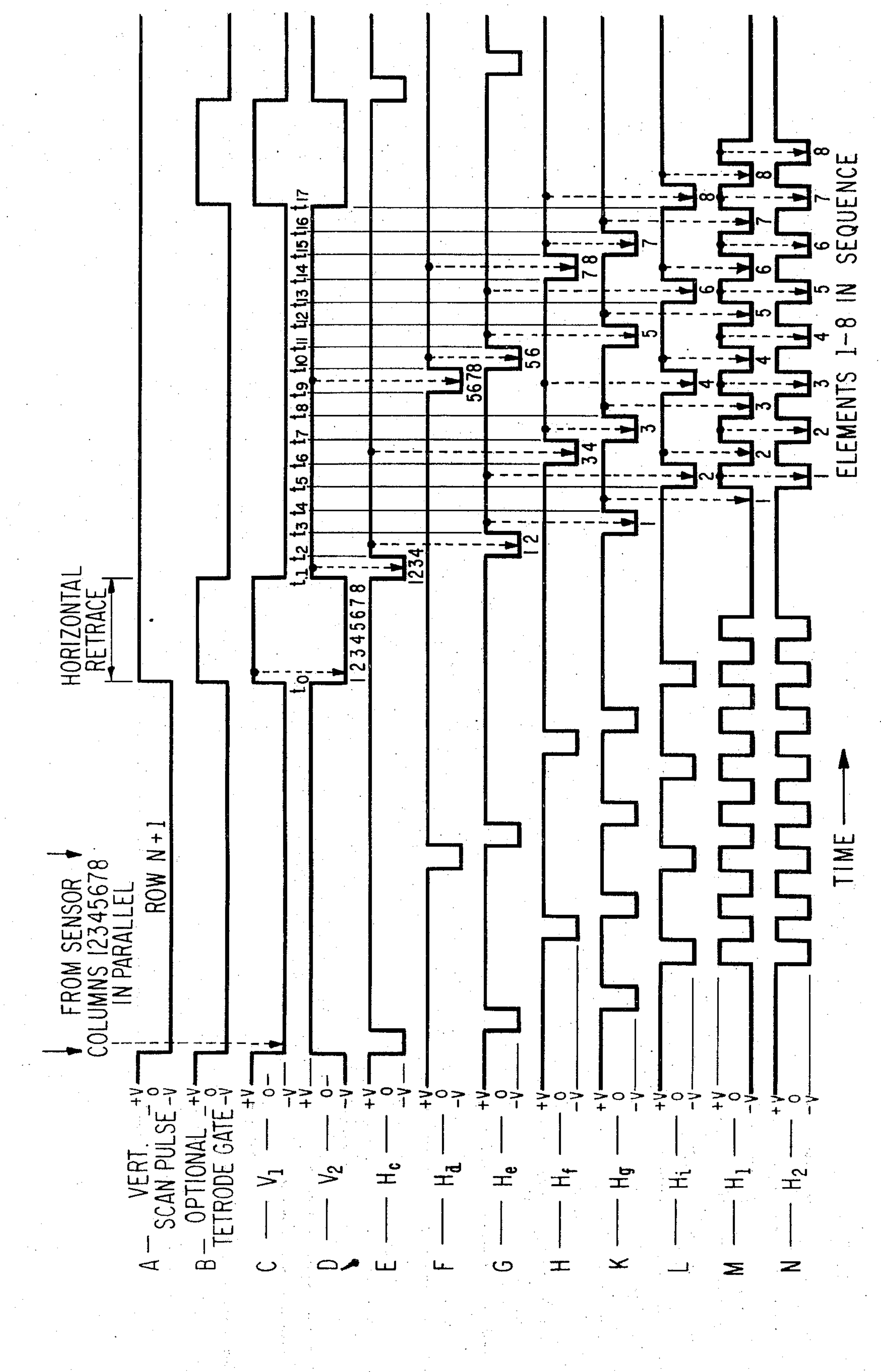
FIG. 3 is a waveform diagram of signals applied to the circuit of FIG. 2.

The operation of the circuit FIG. 2 may best be understood by reference to the waveforms shown in FIG. 3. The devices are assumed to be of the P-type conductivity and the waveforms and their polarity are applicable to P-type devices.

A negative going scan pulse of the type shown in waveform A transfers the information contained in the photodiodes of any row (e.g., N + 1) to columns 1 through 8. The duration of the scan pulse may extend for a full decoding cycle (e.g., time $t_1$ through $t_{17}$). As indicated in waveform B a potential of −V volts applied to the gate electrodes of the tetrode input transistors, $T_{1j}$, enables the conduction of transistors T11 through T18. A negative going $V_1$ pulse, of the type shown in waveform C, following a scan pulse enables transistors T21 through T28 and transfers signals from columns C1–C8 to the second row of parallel store 12. When at time $t_0$ the pulse $V_1$ goes positive and the pulse $V_2$ goes negative, as shown in waveforms C and D, transistors T31 through T38 are enabled and charge signals are transferred to lines L1 through L8.

At time $t_1$ as shown in waveform D, the pulse $V_2$ goes positive, turning off transistors T31 through T38, and raising the potential at each one of the input lines (L1 through L8) to a potential value of $(-V + e_{sj})$ volts where $e_{sj}$ defines the charge signal for a particular column. The decoding of the signals applied in parallel to lines L1 through L8 is as follows. From time $t_1$ to $t_2$ the pulse $H_c$ enables transistors Q11 through Q14 causing the transfer of charge signals from lines L1 through L4 to nodes M1 through M4. The potential at nodes M1 through M4 goes to $9{-}3V + e_{sj})$ volts. During this time interval transistors Q15 through Q18 are disabled and nodes M5 through M8 remain charged at a level of −V volts. At time $t_2$ the $H_c$ pulse goes positive and the potential at lines M1 through M4 goes to the level of $(-V + e_{sj})$ volts. At time $_{c\ 2}$ the $H_e$ pulse enables transistors Q21, Q22, Q25 and Q26. However, enabling transistors Q25 and Q26 does not transfer any charge signals along their transfer paths since there was no prior transfer of signal through transistors Q15 and Q16. Therefore, the $H_e$ pulse only causes the transfer of signals through transistors Q21 and Q22. That is, the signal is transferred from nodes M1 and M2 to nodes N1 and N2, respectively. At time $t_3$ the $H_e$ pulse terminates, blocking the further transfer of charge through transistors Q21, Q22 and preventing conduction through transistors Q25 and Q26. Concurrently, the pulse $H_g$ enables transistors Q31, Q33, Q35 and Q37 in the third decoding stage. At this time, the $H_g$ pulse causes the transfer of a charge signal only through transistor Q31 since there was no prior transfer of signal to the source electrodes of the other transistors enabled by $H_g$. The charge signal present at node N1 is thus transferred to node P1 and the charge signal on line L1 has been decoded and transferred to node P1.

At time $t_4$ the $H_g$ pulse goes positive and no further decoding pulses are applied from time $t_4$ to time $t_5$. At time $t_5$ the $H_i$ pulse goes negative enabling the even numbered transistors in the third stage of the decoder. At this time, the $H_i$ pulse causes the transfer of charge signals only from node N2 to node P2. A charge signal is thus transferred from line L2 to node P2, the L2 signal being produced at P2 one cycle after the production of the L1 signal at P1.

At time $t_6$, the $H_f$ pulse enables transistors Q23, Q24, Q27 and Q28 in the second decoder stage. Signals are then transferred from nodes M3 and M4 to nodes N3 and N4, respectively. At time $t_7$, and $H_g$ pulse causes the transfer of charge signals from node N3 to node P3. At time $t_9$, an $H_d$ and a pulse $H_i$ enable, respectively, transistors Q15 through Q18 in the first decoding stage and the even numbered transistors of the third decoder stage. The $H_d$ pulse causes the transfer of charge signals from lines L5 through L8 to nodes M5 through M8 and the $H_i$ pulse causes the transfer of charge signal through transistor Q34 from node N4 to P4. Since all the transistors $Q_{2j}$ in the second decoder stage are disabled and there is no charge signal applied to the source electrode of any transistor other than Q34, no other transfer path than that of Q34 is open. At time $t_{10}$ the $H_d$ pulse and $H_i$ pulse go positive, terminating the sequential transfer of signals from lines L1 through L4 to nodes P1 through P4.

Beginning with time $t_{10}$ the $H_e$, $H_f$, $H_g$ and $H_i$ pulses are applied, in a similar sequence to that already described, to complete the sequential transfer of charge signals from nodes L5 through L8 to nodes P5 through P8. It has thus been shown that by means of a charge transfer decoder the signals applied in parallel to the input lines of the decoder may be decoded in an ordered sequence and produced in sequence at nodes P1 through P8, respectively.

The signals present at nodes p1 through P8 are then transferred, in order, by means of the charge transfer fan-in tree 26 to output terminal 5. $H_1$ and $H_2$ clock pulses, of the type shown in waveforms M and N, modulate the transistors of the charge transfer tree 26. Note that all the transistors in any one row are enabled simultaneously. But, since only one signal at a time is present at nodes P1 through P8, only one signal at a time is transferred down to terminal 5, as illustrated in waveforms M and N.

What is claimed is:

1. A charge transfer decoder comprising:

N input points, where N is an integer greater than 1, and an output terminal;

means for applying signals in parallel to said N input points;

a plurality of charge transfer devices, each device having a conduction path and a control electrode;

N charge transfer paths, each path connected between a different one of a said N input points and said output terminal; each path including at least a first and a second one of said charge transfer devices having their conduction paths connected in series; and means coupled to the control electrodes of said charge transfer devices for selectively enabling the first devices in selected ones of said N paths for transferring signals along said ones of said N paths and for transferring signals from a first device to a succeeding device along one of said selected ones of said N paths including means for turning off said first device and turning on said succeeding device in said one of said selected ones of said N paths for transferring a signal to said output terminal.

2. The combination as claimed in claim 1 wherein the first devices of said N transfer paths are arranged into M1 groups each including M2 devices; where M1 × M2 is equal to N;

wherein the devices within each one of said M1 groups have their control electrodes connected in common;

wherein the second devices of said N transfer paths are arranged into M2 groups each including M1 devices, the devices within each one of said M2 groups having their control electrodes connected in common; and wherein each device in each one of said M2 groups is connected in series with one device in a different one of said M1 groups.

3. The combination as claimed in claim 2 wherein each one of said charge transfer devices is a field-effect transistor having first and second electrodes defining the ends of its said conduction path and wherein each said device includes capacitance coupled between its control electrode and one of its first and second electrodes.

4. The combination as claimed in claim 2, wherein said means for selectively enabling selected charge transfer devices includes M1 and M2 control lines;

wherein each one of said M1 control lines is connected to the control electrodes of the devices of a different one of said M1 groups;

wherein each one of said M2 control lines is connected to the control electrodes of a different one of said M2 groups;

wherein said means for selectively enabling also includes means for applying a signal to one of said M1 lines, at a time, for enabling the transfer of charge signals through the first devices in the M1 group controlled by said one of said M1 lines; and means for applying enabling signals to one of said M2 lines at a time.

5. The combination as claimed in claim 2, wherein said first and second devices are transistors and wherein each of said transfer paths further includes a third transistor having its conduction path connected in series with said first and second transistors thereof.

6. The combination as claimed in claim 5 further including a source of fixed bias;

wherein each one of said third transistors has a source and a drain defining the ends of said conduction path and a gate for controlling the conductivity of said conduction path; and means for applying said bias to the gate of each one of said third transistors for biasing them into conduction.

7. The combination as claimed in claim 1 wherein each one of said N transfer paths includes n transfer devices having their conduction paths connected in series; where $2^n=N$; and wherein the means for selectively enabling selected ones of said charge transfer devices includes 2n control lines coupled to the control electrodes of said n transfer devices.

8. The combination as claimed in claim 7 wherein each one of said charge transfer devices is a field-effect transistor having first and second electrodes defining the ends of said conduction path and wherein each said device includes capacitance coupled between the control electrode and one of said first and second electrodes.

9. The combination as claimed in claim 7 wherein one of said control lines is connected to the $i^{th}$ devices in one half of said N paths, defined as Group I, and wherein a second one of said control lines is connected to the $i^{th}$ devices in the other half of said N paths, defined as Group II; where $i$ defines the position of one of said devices along said N paths and may vary between 1 and $n-1$ and where $(i+1)$ defines the position of a succeeding device along one of said N paths closer to said output terminal; and wherein a third one of said control lines is connected to the $(i^{th}+1)$ devices in one half of said Groups I and II, and a fourth one of said control lines is connected to the $(i^{th}+1)$ devices in the other half of said Groups I and II.

10. The combination as claimed in claim 9 wherein the $n^{th}$ device in each one of said N paths is coupled through a gradually converging path to said output terminal.

11. The combination comprising:

N input points, where N is an integer greater than 1, and an output terminal;

means for applying signals in parallel to said N input points;

a plurality of charge transfer devices, each device having a conduction path and a control electrode;

N charge transfer paths, each path connected between a different one of said N input points and said output terminal; each path including $n$ of said charge transfer devices having their conduction paths connected in series; where $2^n=N$; the first of said $n$ devices being closer to said input point and the $n^{th}$ device being furthest from said input point; the same numbered devices along said N paths being divided into two groups;

$2n$ control lines; and means coupling a different one of said $2n$ control lines to the control electrodes of the devices of a different one of said groups; said coupling means including: means connecting one of said control lines to the $i^{th}$ devices in one half of said N paths defined as Group I; means connecting a different one of said control lines to the $i^{th}$ devices in the other half of said N paths defined as Group II; means connecting a still different one of said control lines to the $(i^{th}+1)$ devices in one half of said Group I and in one half of said Group II; and means connecting a still different one of said control lines to the $(i^{th}+1)$ devices in the other one half of said Group I and in the other one half of said Group II; where $i$ defines a particular device along each one of said N paths and $i+1$ defines the next device along each one of said paths closer to said output terminal.

12. The combination as claimed in claim 11 further including means for selectively applying signals to said control lines for transferring signals from one device to a succeeding device along selected ones of said N paths including means for turning OFF said one device and turning ON said succeeding device, said means for applying signals also including means for enabling the $i^{th}$ devices in only one half of said N paths at a time.

13. The combination comprising:

N input points where N is an integer greater than 1, and an output terminal;

means for applying signals in parallel to said N input points;

2N charge transfer devices; each one of said devicess having a conduction path and a control electrode;

M1 and M2 control lines, where M1 × M2 is equal to N;

N transfer paths, each path connected between a different one of said N input points and said output terminal; each path including a first and a second one of said charge transfer devices having their conduction paths connected in series; the first transfer devices of said N paths being divided into M1 groups, each group including M2 devices; and the second transfer devices of said N paths being divided into M2 groups comprised of M1 devices;

means connecting a different one of said M1 control lines to the control electrodes of a different one of said M1 groups; and means connecting a different one of said M2 control lines to the control electrodes of a different one of said M2 groups.

* * * * *

UNITED STATES PATENT OFFICE

CERTIFICATE OF CORRECTION

PATENT NO. : 3,873,851

DATED : March 25, 1975

INVENTOR(S) : Paul Kessler Weimer

It is certified that error appears in the above-identified patent and that said Letters Patent are hereby corrected as shown below:

Col. 1, line 11 "prallel" should be ---parallel---.
line 12 "parallel," should be ---to---.
line 14 "known" should be ---Known---
line 19 "to" should be ---of---

Col. 2, line 16 "I,Q)" should be ---T,Q)---

Col. 3, line 26 "or" should be ---of---
line 63 "mode" should be ---node---
line 67 "(¯V" should be ---(-V---

Col. 4, line 35 "transistor" should be ---transistors---
line 43 "transistor" should be ---transistors---
line 45 "$(-1 +e_{2j})$" should be ---$(-V + e_{sj})$---

Col. 5, line 50 "Z." should be ---into---
line 51 "A" should be ---Z---

Col. 6, line 24 "is" should be ---as---
line 32 "to" (3rd. occurrence) should be ---the---
line 36 "in" should be ---the---
line 46 "to" (2nd. occurrence) should be ---the---

Col. 7, line 41 "$9-3V +e_{sj})$" should be ---$(-3V +e_{sj})$---
line 46 "$_{e\ 2}$" should be ---$t_2$---

Col. 8, line 36 "pl" should be ----Pl----
line 55 delete "a" (2nd occurrence).

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*